Oct. 23, 1956     J. K. NEUSCHEL     2,767,759

TIRE TREAD CONSTRUCTION

Filed Oct. 19, 1954     2 Sheets-Sheet 1

INVENTOR.

BY JOHN K. NEUSCHEL

Beau, Brooks, Buckley + Beau,
ATTORNEYS.

Oct. 23, 1956 J. K. NEUSCHEL 2,767,759
TIRE TREAD CONSTRUCTION
Filed Oct. 19, 1954 2 Sheets-Sheet 2
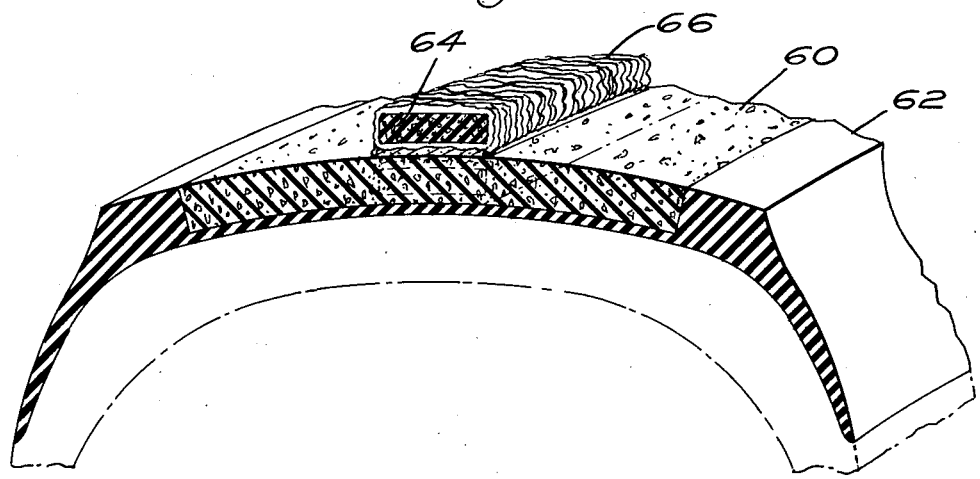
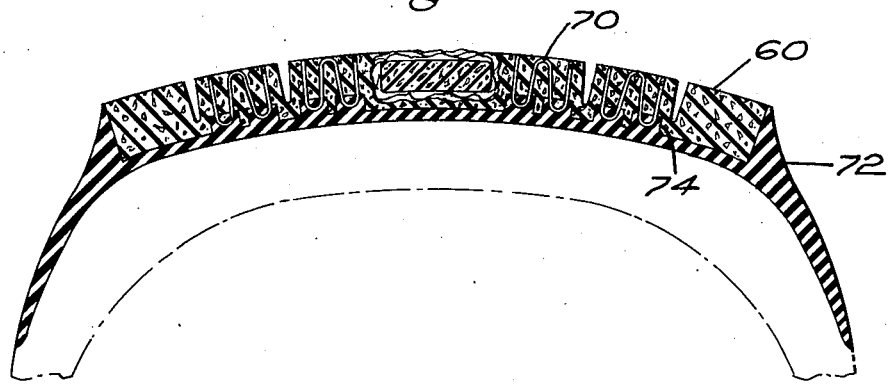
INVENTOR.
BY JOHN K. NEUSCHEL
Beau, Brooks, Buckley & Beau,
ATTORNEYS.

United States Patent Office 2,767,759
Patented Oct. 23, 1956

2,767,759
TIRE TREAD CONSTRUCTION
John K. Neuschel, Richfield Springs, N. Y.
Application October 19, 1954, Serial No. 463,142
19 Claims. (Cl. 152—211)

The present invention generally relates to vehicle tire constructions and more particularly to an improved vehicle tire construction having greater traction under unfavorable driving conditions.

Heretofore, wires of various sinuous shapes and sizes have been invented for use in various types of tire treads for the purpose of increasing the traction of the tires under adverse driving conditions. The theory of operation in these cases is that the wires during rotation of the tire are thrown radially outwardly under the urge of centrifugal force by an amount depending upon the speed of rotation of the wheel. Thus, under very slippery conditions the wheel rotates very rapidly so that the wire portions are thrown outwardly by an amount in proportion to such increased speed of rotation and thereby increase the holding power and traction of the tire tread as driving conditions become more adverse. The ideal condition is for the wires to be in their protruded condition only when maximum traction is required as for example on an icy or otherwise slippery stretch of roadway and to be withdrawn immediately when the roadway condition has become improved since otherwise the ends of the wires would tend to have their end portions bent and also suffer excess wear so that the performance of such wire elements would not remain reliably constant due to uneven wear and mutilation of their ends. Furthermore, these wires when simply embedded in the tread rubber tend to become dislodged and thereafter to slip in use and even to break off and fall out with consequent poor performance and premature wear of the tire tread.

Accordingly, a primary object of the present invention is to provide improved connection means for positively elastically securing variously sinuated forms of wires to the base portion of a tire construction.

A further object of the present invention is to provide the aforesaid connection means in combination with an improved type of abrasive camel-back construction arranged for relatively simple integration with either old or new tire constructions, when vulcanized under heat and pressure conditions.

A still further object of the present invention is to provide an improved arrangement of parts comprising an improved non-abrasive camel-back construction having enlarged wing portions at opposite ends thereof, the wing portions being arranged to enclose an abrasive rubber tread wear portion having a plurality of continuous variously sinuously shaped wires embedded therein at spaced intervals near its periphery, the wires being mounted in elastic connection with the non-abrasive camel-back.

And, a still further object of the present invention is to provide, in combination with an improved type of camel-back construction having an abrasive rubber tread portion, improved means for integrating stainless steel wool strands centrally circumferentially along a tire to provide radially extending strand portions auxiliary to continuous multi-point wire formations likewise integrated in the abrasive rubber tread portions on opposite sides thereof.

Further objects and advantages of the present invention will appear in the specification hereinafter.

In the drawing:

Fig. 8 is a fragmentary generally perspective view of still another modification of the present invention; and, Fig. 9 is a fragmentary generally sectional view showing still another modified form of the present invention.

Figure 1:
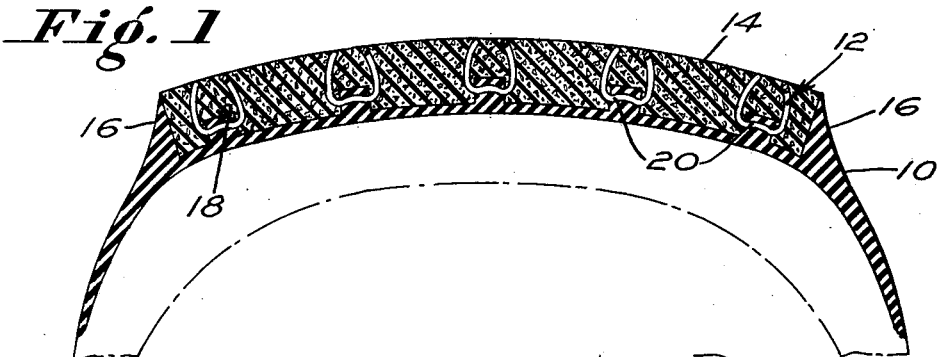
Fig. 1 is a fragmentary generally sectional view taken through a tire construction embodying the present invention.
Figure 2:
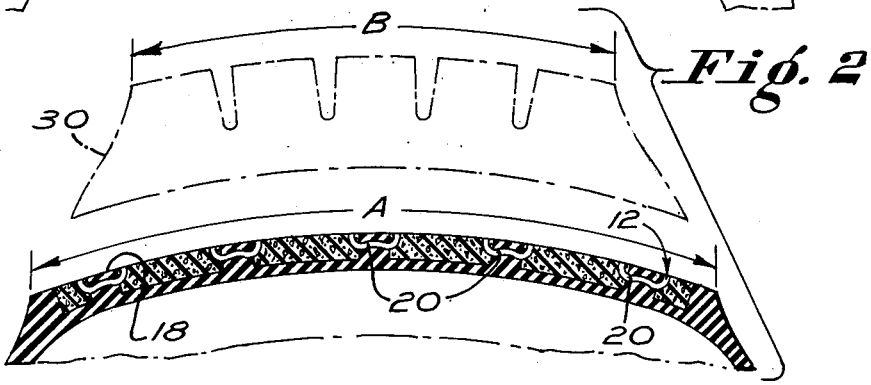
Fig. 2 is a fragmentary generally sectional view showing the tread of the tire shown in Fig. 1 in worn down condition and illustrating its size relative to a standard tire tread shown in dotted lines for purposes of comparison.

Referring now more particularly to the drawing, the embodiment of the invention illustrated in Figs. 1 and 2 therein generally comprises an integral non-abrasive rubber camel-back portion 10, a plurality of continuous kinked wire members 12 extending circularly around the periphery of the central portion of the camel-back portion 10, and an abrasive rubber fill portion 14 mounted over the center portion of the camel-back portion 10 and having these continuous wire portions 12 embedded therein. The abrasive rubber fill 14 is preferably of the type having hard wood chips embedded therein to increase its traction properties on ice and snow as is commonly known in the art and will be of less density and greater resilience than the tire understructure to facilitate wire protrusion in the roadway contact area of the tire tread in addition to the wire protrusion effect described elsewhere herein.

A particular feature of the present invention is to form the camel-back portion 10 into generally cylindrical form as shown in Fig. 1 with its edges at opposed sides thereof being formed into enlarged wing-like protrusions 16—16. Intermediate these wing portions 16—16 there will be a plurality of circumferential ridge portions 18 which will be of an elastic and highly adhesive character whereby the lower crosswise connecting portions 20 of the wires 12 may be easily embedded therein preparatory to the vulcanizing and tread forming process as under heat and pressure conditions in a mold for the purpose of performing a permanent connection between these wire portions 20 and the non-abrasive camel-back 10. Thus, these above circumferential radially outwardly extending ridge portions 18 will have the lower portions of the wires 12 embedded therein at the points of interconnection therebetween so that under actual operating conditions these wires will remain mechanically bonded to the tire carcass even in the event that the chemical adhesion of the wires to the abrasive rubber tread portion 14 is disturbed, and yet being sufficiently resiliently supported for these wires to protrude slightly radially outwardly in operation for achieving maximum traction on hard packed snow and ice in the manner noted above.

Figures 5, 6:
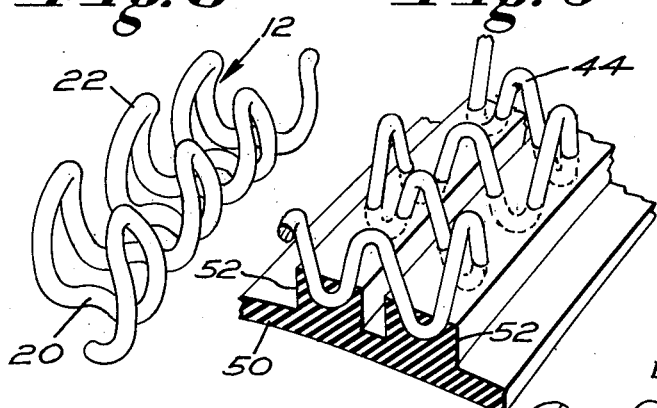
Fig. 5 is a fragmentary generally perspective view of a detail of Fig. 1.
Fig. 6 is a fragmentary generally perspective view of a detail of Fig. 4.

The continuous wire members 12 are formed in the manner illustrated in Fig. 5 to provide a plurality or series of spaced staple-shaped arcuated protrusions 22 connected at their lower ends by the lateral segments 20 so as to be adapted for being easily embedded in the annular ridges 18 in the above described manner. It will be appreciated that in actual use the outer loop ends of the arcuated staple wire portions 22 will gradually be worn away to provide multiple closely spaced wire points protruding out of the abrasive rubber camel-back 14 to improve with use the traction of a tire made according to the invention, the wires 12 then becoming discontinuous and amounting to a plurality of individual outwardly generally U-shaped segments mechanically bonded at spaced positions along the rim of the rib portion 18 to permit freer action of these individual U-shaped wire portions under the influence of the operational forces under actual driving conditions.

As shown in Fig. 2, a tire construction made in accordance with the present invention will preferably be made of substantially greater widths than standard tire treads of the type indicated in dotted lines at 30, the dimension designated "A" by way of example being approximately 30% greater than the dimension designated "B" and thereby providing greater road contact with consequent greater traction. Also, when the abrasive rubber tread portion 14 and the wire claws 22 wear down to the outer surface of the annular ridge portion 18, it is another feature of the invention that the effective abrasive rubber area exposed for providing traction under winter driving conditions will still be as much or greater than the effective tread area of a standard tire tread as shown by dotted lines at 30 in Fig. 2. At the same time, the appearance of the outer surfaces of the ridge portion 18 will provide a visual indication to an operator that the tire should be reconditioned as for example by retreading or the like, even though it will continue for some time to perform satisfactorily as a winter tire. This provides an additional safety feature so that prudent drivers will have a definite indication of the state of wear of a tire manufactured in accordance with this above invention.

Figure 3:
Fig. 3 is a fragmentary generally sectional view showing a modification of the present invention.

A slight modification of the present invention is illustrated in Fig. 3 wherein a pair of annular ridge portions 40—40, similar to the ridge portions 18 discussed above, will be preformed of a material having slightly more elastic and adhesive properties than those encompassed in a non-abrasive rubber—crude or synthetic—camel-back portion 42 which is similar to the camel-back portion 10 described above minus the aforesaid ridges 18. Thus, the ridge members 40 may be formed of a material which will permit the loop portions of the slightly modified form of wires 44 to be easily embedded therein preparatory to placing the tire in a retread matrix, or the like, for the purpose of vulcanization under heat and pressure during which time the abrasive rubber tread portion 46 is bonded to the camel-back 42.

According to this above modification of the invention it would be necessary to provide separate means in a tire vulcanizing apparatus for mounting the continuously looped wires 44 on the walls of the mold matrix since that function would be performed by the especially adhesive properties of these ridge members 40. The wires 44 preferably will be formed as shown in Fig. 3 to provide a double row of staple-shaped portions whereby upon wearing away of the upper connecting wire portions thereof the number of claw portions embedded in the tread will be greatly multiplied.

Figure 4:
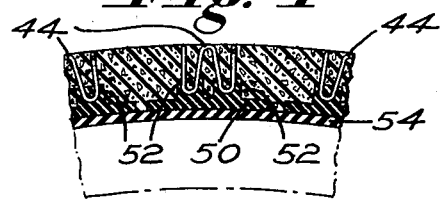
Fig. 4 is a fragmentary generally sectional view showing a further modification of the present invention.

In the embodiment of the invention illustrated in Figs. 4 and 6, the wires 44 will have their lower U-shaped portions preassembled in a rubber base comprising a non-abrasive rubber base portion 50 formed to have a pair of spaced parallel co-extensive ridge protrusions 52—52. In this form of the invention these wires would be preassembled into their respective ridge portions 52—52 and may be shipped to the trade in this condition so as to be adapted to be easily cemented onto the exterior of a tire camel-back portion 54 as shown in Fig. 4 preparatory to a retreading operation in the field, and thereby simplifying retreading operations by eliminating the need for any mechanical means for holding the wires in a tire retread matrix.

Figure 7:
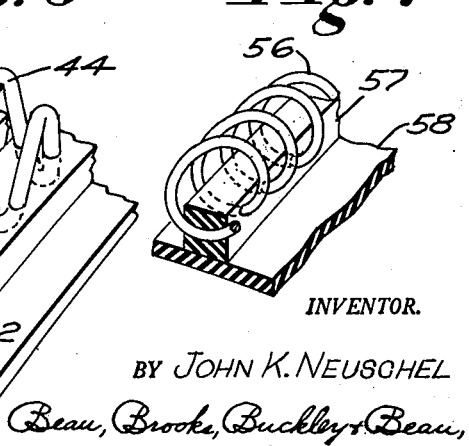
Fig. 7 is a fragmentary generally perspective view of another modification of the invention.

In the still further modification of the invention illustrated in Fig. 7, a generally coil shaped wire 56 is shown to be preassembled in a ridge portion 57 of a rubber mounting member 58 for use in a manner similar to that discussed above in connection with the modification of the invention illustrated in Figs. 4 and 6.

Illustrated in Figs. 8 and 9 is a further modified form of the invention, a primary feature of which is to provide wool strands arranged to be embedded by being coiled substantially crosswise throughout the circumferential extent in the abrasive rubber tread portion 60 so as to provide radially outwardly positioned stainless steel slivers therein. The tread 60 is bonded to the winged non-abrasive camel-back member 62 in a manner similar to that set forth above in connection with the form of the invention illustrated in Figs. 1 and 2. In this above further modified form of the invention another feature is that the stainless steel will preferably be applied by winding right angularly about a generally elongate strip of abrasive rubber 64 of generally rectangular cross section to cover it along its length by means of the stainless steel wool strands 66 for insertion preferably along the center tire rib portion.

Then, this abrasive rubber elongate member 64 will be positioned intermediate the edges of the abrasive tread rubber portion 60 and wound around the periphery thereof preparatory to vulcanization under heat and pressure of a tire embodying the above components during a tread forming operation in a tire mold of any of the variously known types commonly used in the art. The tire mold matrix will be arranged to press the abrasive rubber strip 64 with its stainless steel wool strands 66 wound thereabout into the abrasive rubber tread portion 60 in the vulcanization process during which time the abrasive rubber 60 is in a generally pliable or semi-fluid state with the result that the steel wool strands mounted in generally rectangular form will be embedded in the abrasive rubber tread throughout its circumference so as to provide additional traction under actual operative conditions. It will, of course, be appreciated that wearing away of the portions of the stainless steel strands lying along the tire tread surface of this above tire structure of Figs. 8 and 9 will leave exposed a pair of spaced series of circumferential radially outwardly positioned stainless steel strand portions whose outer ends will aid in developing increased traction of a tire made in accordance with this invention under a wider variety of adverse driving conditions.

The above described arrangement for embedding stainless steel strands in a tire carcass made according to the present invention is shown in Fig. 9 in combination with adjoining rows of multi-point wires 70 arranged to be in mechanical connection with a non-abrasive rubber winged portion 72 integrally secured to a tire carcass in the aforesaid manner. The mechanical bond between the wires 70 and the non-abrasive rubber camel-back 72 is accomplished by reason of the inner portions of these wires being embedded in a plurality of spaced circumferentially extending ridge portions 74 in a manner similar to that described above. The wing portions of this camel-back 72 will be arranged to accommodate abrasive rubber tread portions at the opposite sides of the road engaging portion of the tire and medially thereof the abrasive rubber treads will be formed to contain wires 70 arranged at both sides of spaced stainless steel wool strands integrated therein in the above described manner. It will be appreciated that while no circumferential tread grooves are shown adjacent the opposite sides of the central ridge portion 64, a modified form of construction will separate this central ridge portion and its stainless steel wool covering 66 by means of tread grooves adjacent the sides thereof for providing additional traction in hard packed snow, or the like.

Therefore, while I have particularly described several embodiments of the present invention, it will be understood by those skilled in the art that the invention is not so limited but that various other modifications and changes may be made therein within the spirit of the invention and the scope of the following claims.

What is claimed is:

1. In a tire tread construction, a generally annular non-abrasive rubber base portion having a radially outwardly extending annular ridge portion thereon, a generally circular continuous wire member formed into sinuated staple-shaped protrusions throughout its circumference with the lower portions of these protrusions being embedded in said annular ridge portion at spaced positions therealong, and an annular abrasive rubber tread portion being bonded and formed when vulcanized into an integral mass with said base portion so as to have said wire members embedded therein near the outer tread surface to provide a tire surface having high traction under adverse weather conditions.

2. In a tire construction, a solid rubber circular under-structure formed with enlarged side portions providing radially outwardly extending shoulders thereat and being bonded over a tire carcass, an abrasive rubber fill circumfused over said under-structure between said shoulders, a plurality of continuous annular wire members kinked along their circumference into staple-shaped portions arranged to be embedded in said abrasive rubber fill circumjacent the periphery of said tire carcass, and means mechanically interconnecting said staple-shaped portions to said tire under-structure to hold the wire members without interfering with the protrusion of the ends of said staple-shaped portions thereof under actual operating conditions.

3. In a tire construction, a non-abrasive rubber base member of generally cylindrical form having its opposite side portions formed with outstanding wing-like enlargements, the base member having a plurality of spaced radially outwardly extending annular ridge portions formed intermediate said opposite side portions, a plurality of annular wire members kinked in generally staple-shaped fashion throughout its circumference with their staple base portions embedded at spaced positions in said ridge portions for mechanical interconnection therebetween, and an abrasive type rubber being integrally molded between said base member side portions so as to be bonded to the external periphery of said base member with said wire portions being embedded therein, the difference between the outer surface area of the abrasive type tread and the total surface area of said annular ridge portions being equal to or greater than the tread area of a standard tire.

4. A tire retread construction comprising a generally cylindrical non-abrasive rubber base member adapted to be bonded to an exterior peripheral surface of a tire, an annular loop of elastic highly adhesive rubber material being bonded around said base member, a continuous wire member kinked into a plurality of staple-shaped portions embedded in said annular loop, and an abrasive rubber fill circumfused over said base members so as to contain said loop and wire member embedded therein to form a winter tread having high traction.

5. In a tire tread construction, a flexible non-abrasive rubber base portion provided with a laterally outwardly extending ridge portion, a continuous wire member formed into staple-shaped portions throughout its length, the bottom of each of the staple-shaped portions of said wire member being embedded in said ridge portion at spaced positions therealong, and abrasive rubber means bonded and formed into an integral mass together with said base portion, ridge portion, and wire members to provide a tire tread formation having high traction under adverse weather conditions.

6. In a tire construction, a flexible rubber under-structure having enlarged side portions to provide lateral outwardly extending shoulders thereat, an abrasive rubber tread formation being bonded between said shoulders to said rubber under-structure, a plurality of spaced continuous wire members being embedded in said abrasive rubber tread formation and being kinked along their lengths into staple-shaped formations projecting outwardly toward the tread surface, and means interconnecting the lower portions of said staple-shaped formations to said under-structure to prevent the wire members from being dislodged without substantially interfering with the protrusion thereof under actual operating conditions.

7. In a tire construction, a non-abrasive camel-back flexible member having outstanding wing-like enlargements at its sides and a plurality of integrally formed lateral ridge portions therebetween, a plurality of U-shaped wires having their base portions embedded at spaced positions in said ridge portions for mechanical interconnection therebetween, and an abrasive rubber tread portion integrally molded between the spaced shoulders provided by said enlargement for bonding to the camel-back ridge portions with said wire portions embedded therein.

8. A tire retread construction comprising a non-abrasive flexible camel-back member adapted to be bonded to an exterior prepared peripheral surface of a tire, an elongate elastic and highly adhesive rubber strip having a plurality of staple-shaped wires embedded therein at spaced positions along its length and being bonded to the exterior face of said camel-back, and an abrasive rubber tread portion molded over said camel-back member under heat and pressure so as to contain said strip and wires in embedded condition therein.

9. In a tire tread construction, a generally annular non-abrasive rubber base portion having its opposite side portions enlarged to provide a pair of spaced radially outwardly extending shoulder portions, a plurality of spaced annular ridge portions formed to protrude radially outwardly from said base portion intermediate said spaced shoulder portions thereof, a plurality of continuous wire members each formed into sinuated staple-shaped protrusions throughout their length being circumflexed around their companion ridge portions with their respective lower portions embedded therein at spaced positions therealong, and an abrasive rubber fill being circumfused during the vulcanization process into an integral mass with said base portion between the spaced shoulders thereof so as to have said ridges and wire members embedded therein to provide a tire surface having high traction under adverse weather conditions.

10. In a tire construction, a substantially non-abrasive rubber under-structure formed to fit over a tire carcass, this under-structure having enlarged sides formed to provide annular shoulder portions extending outwardly at opposed sides when in fixed position on a tire, a plurality of wire members of U-shaped formation being embedded in said under-structure for mechanical connection thereto, and an abrasive rubber tread portion adapted to be circumfused over said under-structure under heat and pressure conditions in a tire mold to embed said wire members therein.

11. In a tire construction, in combination, a base non-abrasive camel-back member formed with a lateral ridge portion intermediate its sides, wire members kinked into substantially staple-shaped formations having their base portions embedded at spaced positions along said ridge portion for mechanical connection to said base member, an abrasive rubber tread integrally molded over said base member so as to have said wire members embedded therein.

12. A tire retread construction comprising a generally cylindrical non-abrasive camel-back member adapted to be molded onto the exterior peripheral surface of a tire, an annular loop of elastic highly adhesive rubber material having a generally continuous wire member embedded therein which is formed to have a plurality of staple-shaped formations along its length, and an abrasive rubber tread material being molded over said non-abrasive camel-back member so as to contain said wire portions embedded therein whereby this retread construction may be easily molded in a tire mold under heat and pressure conditions onto the exterior of a tire to form a winter tread having high traction.

13. In a tire tread construction, in combination, a flexible non-abrasive rubber base portion mounted on a tire carcass, that base portion being formed with opposed radially outwardly extending wing portions, an abrasive rubber tread portion bonded onto said base portion and between the inner faces of said wing portions, and substantially staple-shaped wire means embedded in said abrasive rubber tread portion thereby providing a wider tire tread formation having high traction under adverse weather conditions.

14. In a tire construction as set forth in claim 2, rows of radially outwardly positioned stainless steel slivers being set in said abrasive rubber fill between said continuous annular wire members embedded therein so as to develop increase road traction on the tire surface.

15. In a tire tread construction as set forth in claim 5, circumferentially disposed rows of radially aligned stainless steel slivers being bonded into said abrasive rubber means adjacent said continuous wire member therein.

16. In a tire construction as set forth in claim 6, a row of stainless steel wool strands set radially within said abrasive rubber tread formation intermediate a pair of said spaced continuous wire members.

17. In a tire construction as set forth in claim 7, stainless steel wool strands set radially within said abrasive rubber tread portion adjacent said wires therein.

18. A tire retread construction as set forth in claim 8, including slivers of stainless steel embedded in said abrasive rubber tread portions in radially extending positions adjacent said wires contained therein.

19. A tire tread construction comprising a flexible non-abrasive rubber base portion mounted on a tire carcass, said base portion having its opposed sides formed into radially outwardly extending wing portions, and an abrasive rubber tread portion being bonded onto said base portion and between the inner faces of said wing portions, thereby permitting standard size tires of this type to be constructed with relatively greater tread area.

References Cited in the file of this patent

UNITED STATES PATENTS

| | | |
|---|---|---|
| Re. 23,135 | Gapen | July 19, 1949 |
| 1,740,616 | Midgley | Dec. 24, 1929 |
| 2,207,099 | Maynard | July 9, 1940 |
| 2,600,506 | Kimes | June 17, 1952 |
| 2,607,386 | Pavlik | Aug. 19, 1952 |